(12) United States Patent
Horikoshi et al.

(10) Patent No.: US 7,502,635 B1
(45) Date of Patent: Mar. 10, 2009

(54) METHOD AND COMPUTER FOR REMOTE COMMUNICATION WHILE OPERATING IN A POWER-SAVING MODE

(75) Inventors: Hideto Horikoshi, Sagamihara (JP); Mitsuhiro Yamazaki, Yokohama (JP); Tomoki Maruichi, Yamato (JP); Masaki Oie, Sagamihara (JP); Keiji Suzuki, Fujisawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1919 days.

(21) Appl. No.: 09/625,762

(22) Filed: Jul. 26, 2000

(30) Foreign Application Priority Data

Jul. 28, 1999 (JP) .................................. 11-213731

(51) Int. Cl.
    *H04B 1/38* (2006.01)
(52) U.S. Cl. .......................... 455/574; 455/557; 455/418
(58) Field of Classification Search ................. 455/574, 455/343, 425, 434, 442, 343.6, 556.1, 557, 455/558; 375/219, 222; 713/300, 320, 325; 340/825.22, 10.33, 7.35, 825.69, 825.72, 340/825.02, 825.52, 825.36
    See application file for complete search history.

(56) References Cited

U.S. PATENT DOCUMENTS

| | | | |
|---|---|---|---|
| 5,471,624 A * | 11/1995 | Enoki et al. ...................... 713/1 |
| 5,524,021 A * | 6/1996 | Scotton et al. .............. 340/7.33 |
| 5,530,879 A * | 6/1996 | Crump et al. ............. 379/93.36 |
| 5,701,121 A * | 12/1997 | Murdoch .................. 340/10.34 |
| 5,742,833 A * | 4/1998 | Dea et al. .................... 713/323 |
| 5,752,202 A * | 5/1998 | Obright ...................... 340/7.34 |
| 5,838,720 A * | 11/1998 | Morelli ..................... 340/10.33 |
| 6,002,918 A * | 12/1999 | Heiman et al. ............. 340/7.23 |
| 6,018,232 A * | 1/2000 | Nelson et al. ............... 320/127 |
| 6,069,929 A * | 5/2000 | Yabe et al. .................. 375/368 |
| 6,088,600 A * | 7/2000 | Rasmussen ................ 340/7.36 |
| 6,104,937 A * | 8/2000 | Fujimoto ................... 340/7.37 |
| 6,167,078 A * | 12/2000 | Russo ........................ 375/222 |
| 6,236,674 B1 * | 5/2001 | Morelli et al. .............. 375/219 |
| 6,256,520 B1 * | 7/2001 | Suzuki ....................... 455/343 |
| 6,278,887 B1 * | 8/2001 | Son et al. .................... 345/211 |
| 6,289,228 B1 * | 9/2001 | Rotstein et al. ........... 340/7.32 |
| 6,289,464 B1 * | 9/2001 | Wecker et al. ............. 713/300 |
| 6,311,276 B1 * | 10/2001 | Connery et al. ............ 713/201 |

(Continued)

*Primary Examiner*—Charles N Appiah
*Assistant Examiner*—Joy K Contee
(74) *Attorney, Agent, or Firm*—Scott W. Reid; Dillon & Yudell LLP

(57) ABSTRACT

A computer and a method for enabling remote communication to a computer operating in a power-saving mode in which one or more one power sources to internal devices are disabled. The computer is equipped with a power management control circuit which is responsive to a first signal indicating that a device used to receive remote communication is to receive power while operating in a power-saving mode. In the event that a remote communications is detected which is targeted for the computer, a second signal is asserted by the remote communications device. The power management control circuit responds by exiting the power-saving mode and restoring power to the disabled power source to enable the computer to process the incoming communication. The remote communication may be through a wireless source such as a radio frequency channel or through a fixed wire such as a telephone network or LAN. Other aspects of the invention enable communication through an option card installed in a option slot or a notebooks docking station such as a radio device, modem, or LAN adapter.

11 Claims, 5 Drawing Sheets

U.S. PATENT DOCUMENTS 6,311,282 B1 * 10/2001 Nelson et al. ................ 345/212
6,347,236 B1 * 2/2002 Gibbons et al. ............. 455/574
6,505,058 B1 * 1/2003 Willey ........................ 455/574
6,570,507 B1 * 5/2003 Lee et al. ................ 340/825.22

* cited by examiner

[Figure 1]
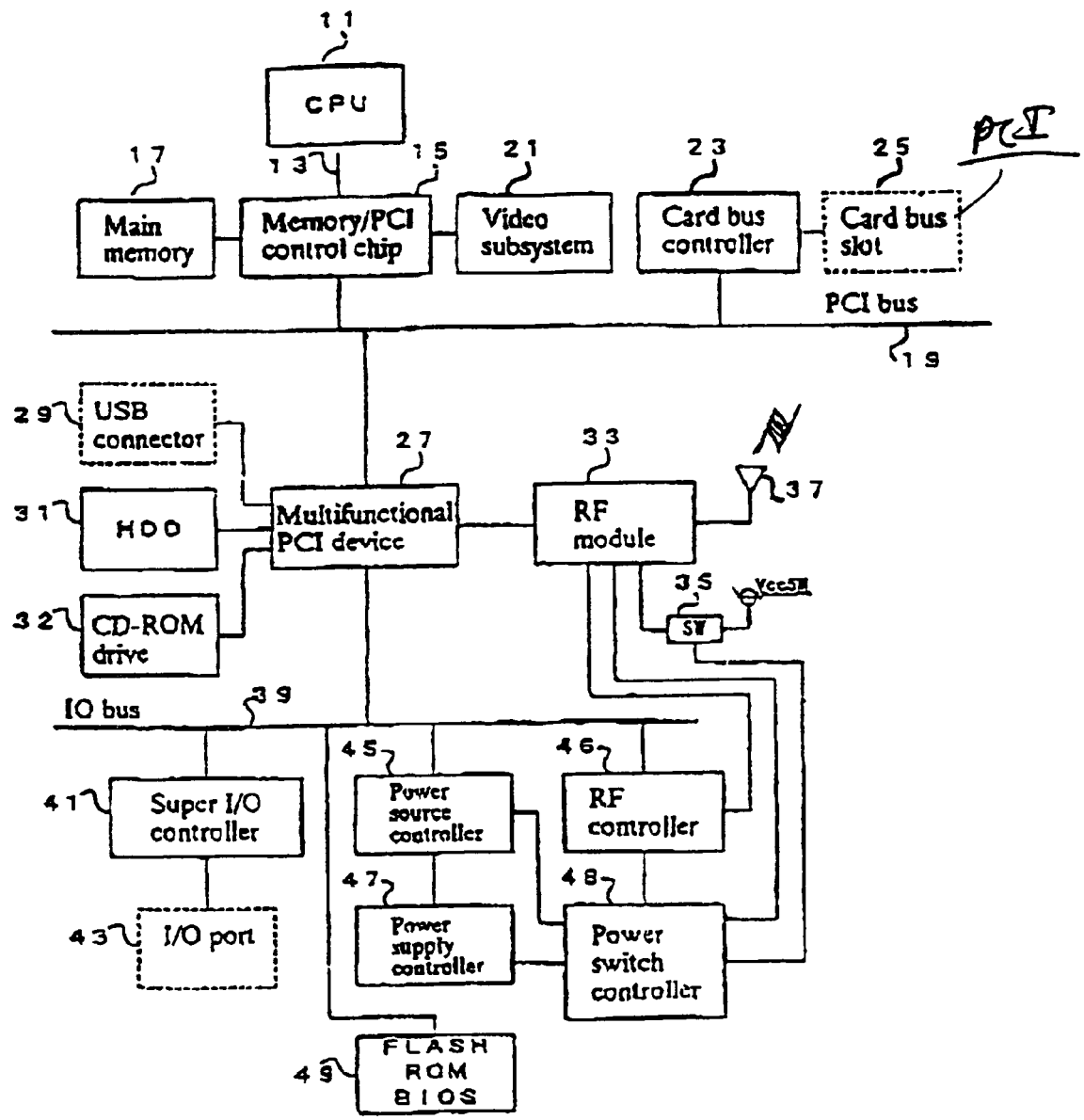

[Figure 2]
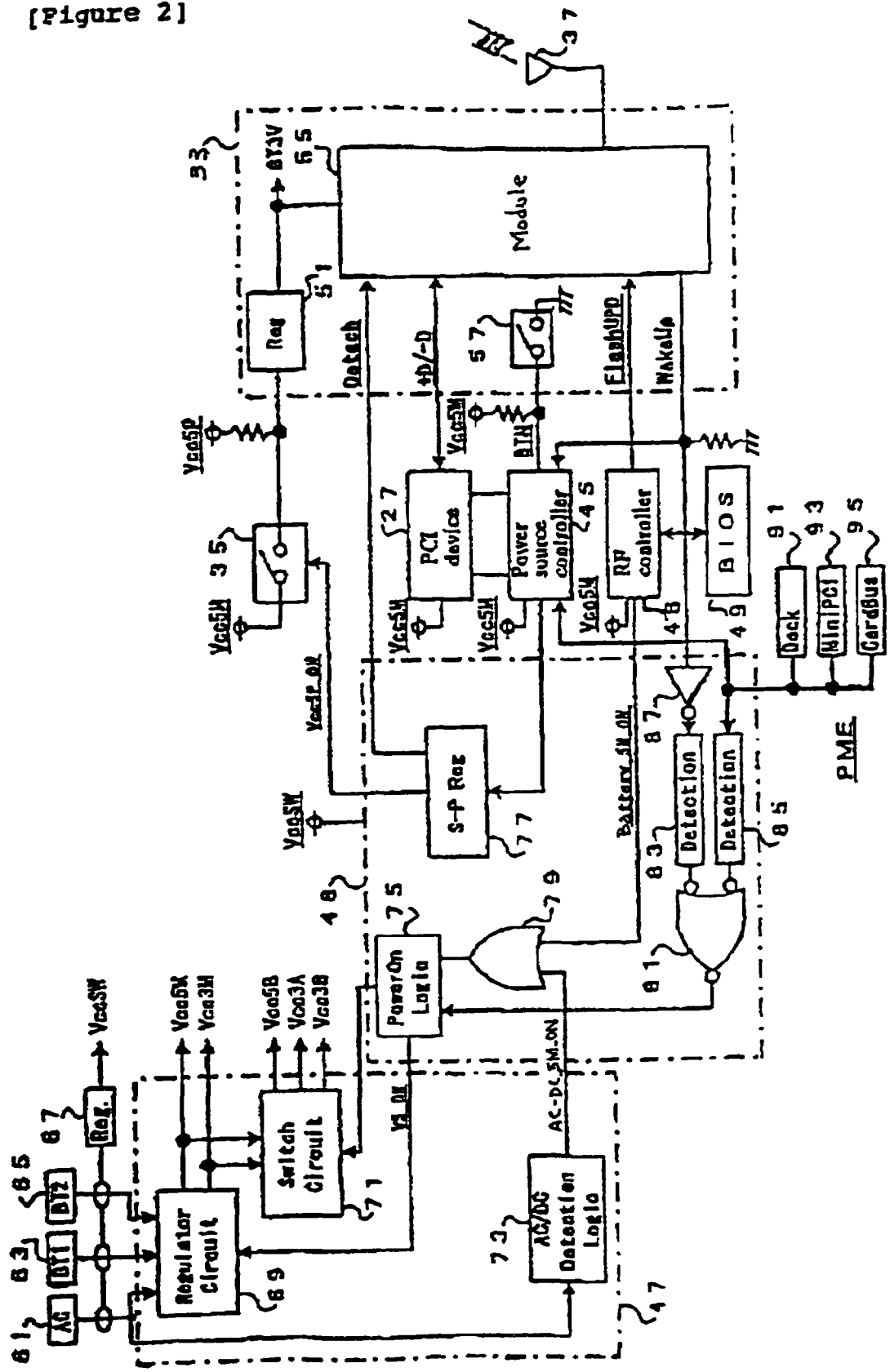

[Figure 3]
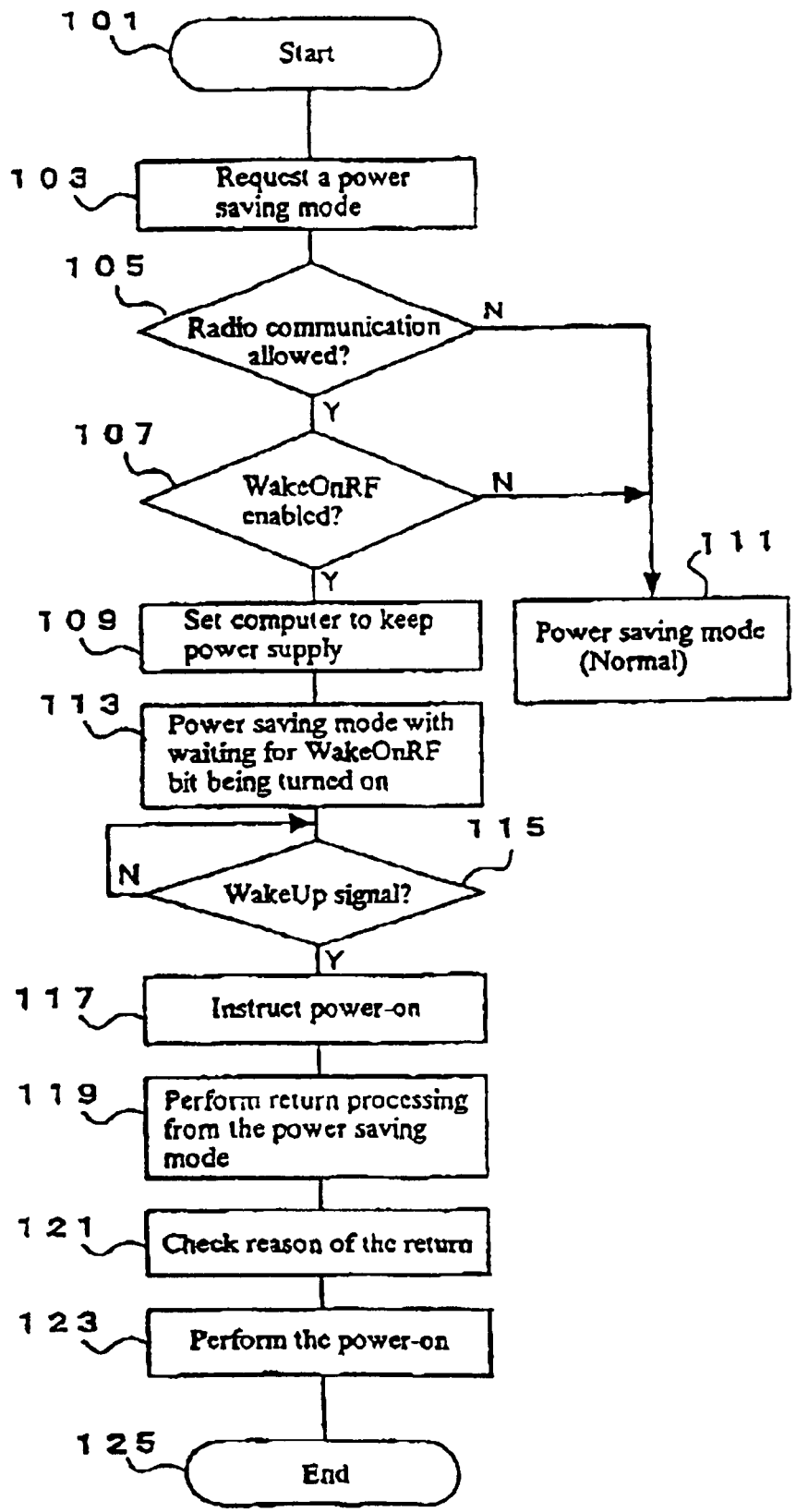

[Figure 4]
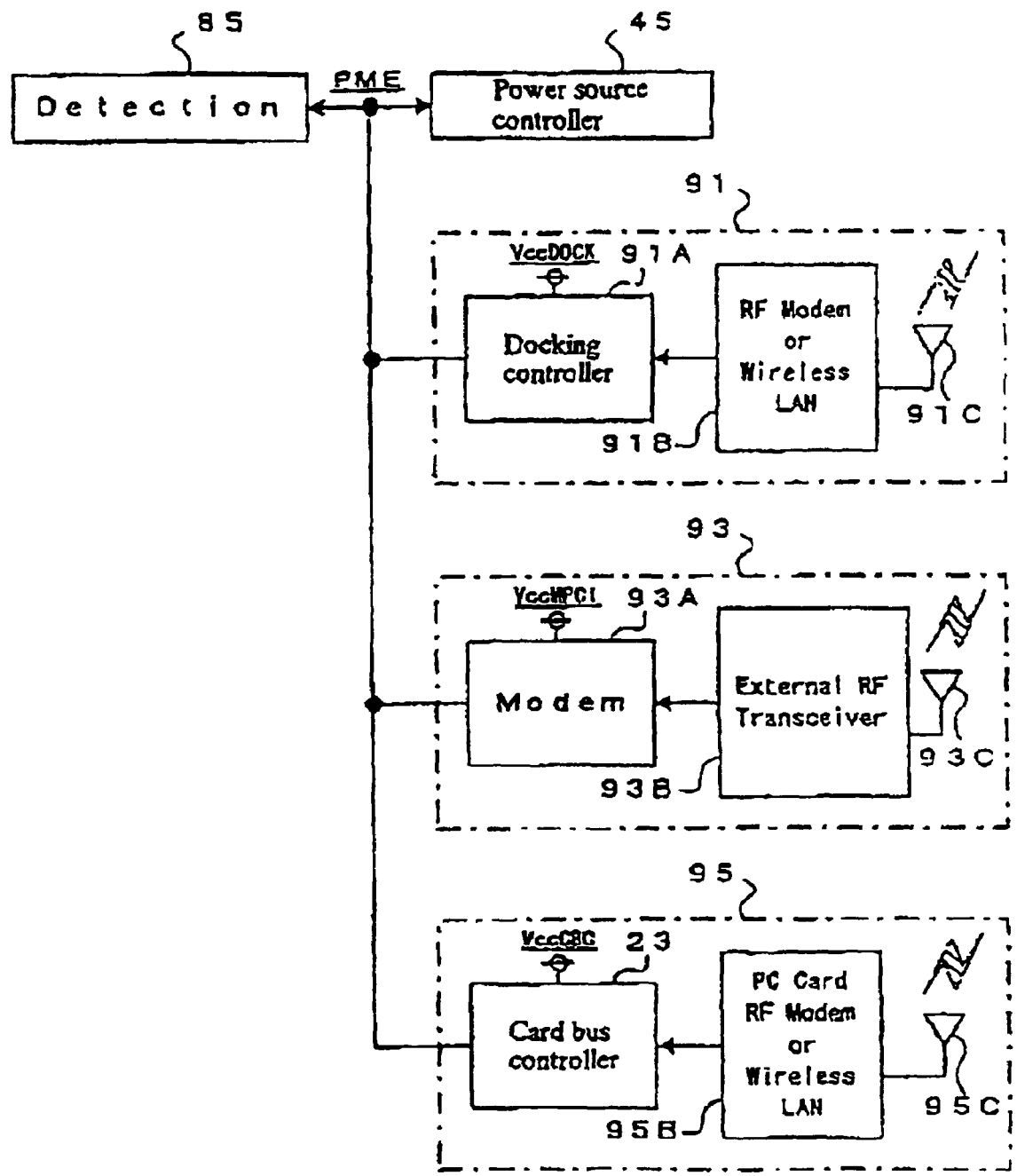

[Figure 5]
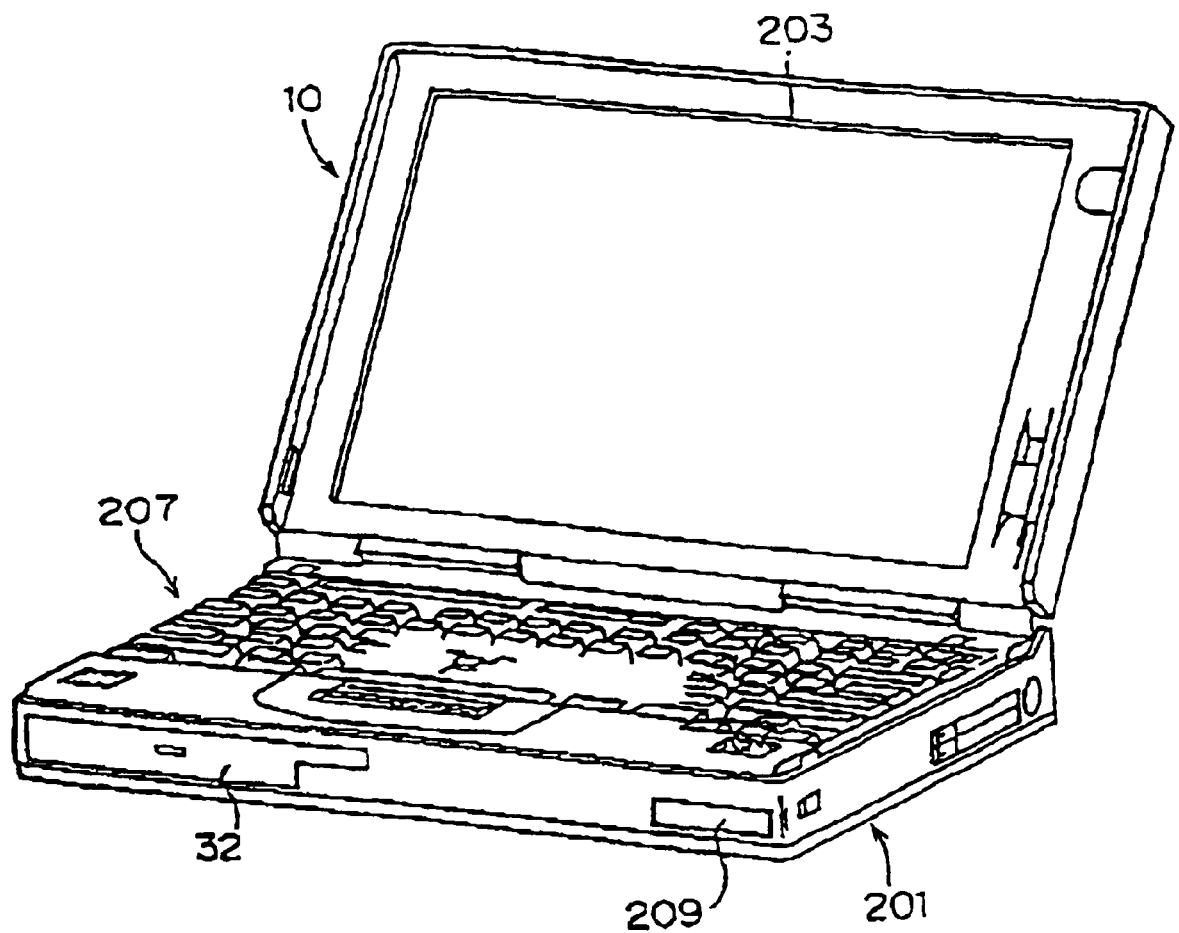

METHOD AND COMPUTER FOR REMOTE COMMUNICATION WHILE OPERATING IN A POWER-SAVING MODE

BACKGROUND OF THE INVENTION

1. Technical Field

The present invention relates in general to methods for remote communication and, in particular, to methods of remote communication while operating in a power-saving mode, and still more particularly, the present invention relates to methods of wireless communication to notebook computers operating in a power-saving mode.

2. Description of the Related Art

Notebook computers typically provide batteries to allow for portability and such computers typically have automated methods for reducing power consumption, to allow for increased operation on a single battery charge. It is common for notebook computers to allow the user to select from a plurality of power saving options for a range of degrees of power-savings. A common method for reducing power is for the notebook computer to enter one or more power down or power saving modes, where the power is disabled to devices which are not being used. Power down modes commonly include a power-saving mode where the main microprocessor enters a power down state where the processor ceases executing program code but can be revived by a triggering events such as an interrupt caused by a pressing a keyboard key.

Recent advancements and diversification in communications include wireless communication between computers. Wireless communication to notebooks can be accomplished using radio frequency channels to transmit and receive information. Other remote communication methods include modems for connection to telephone lines, and devices for connecting to a LAN (local Area Networks) using electromagnetic waves or cable.

Communication to a computer typically requires a computer's operating system and an application software to be active. However, when a computer is in a power-saving mode, a device necessary for communication may be in an inactive power down mode or the microprocessor may be in a state where the program for handling the communications is not active. Accordingly, power down modes may inhibit or make both wire and wireless communication more difficult.

It is desirable to have a methods that allow remote communication to notebook computers which are operating in a power down or a power-saving mode.

SUMMARY OF THE INVENTION

The present invention enables communication to a computer, while the computer is in a power down or power-saving mode. The present method is applicable to wireless communications using a radio frequency channel. A method of the present comprises the steps of: (a) entering a power-saving mode; (b) detecting a wireless signal representing a sequence of bits which are targeted to be received by this computer; and (c) if certain optional conditions are satisfied, exiting the power-saving mode automatically in response to the detection of the wireless signal.

The method may optionally include determining that the wireless signal is targeted for the computer by detecting a particular identification tag which is embedded within the bit sequence. Optionally the power-saving mode may be exited only where status indicators, such as signals, registers, or stored data show that the device that receives wireless communications is installed and enabled. At least one power supply source may be disabled while in the power-saving mode, that is enabled automatically by a power management circuit when a wireless signal is detected that is targeted for the computer. A switch, such as a field effect transistor (FET), may be used to maintain power to the device that receives the wireless message while the computer is in a power-saving mode.

The methods of the present invention include a computer which has a device for receiving a wireless signal representing a bit sequence. While the computer is in a power-saving mode, a power-saving mode control is responsive to a signal indicating the detection of a wireless signal which is targeted for the computer. When this event occurs and certain conditions are satisfied, the power-saving control causes the computer to exit the power-saving mode. The power-saving control may be implemented using a combination of hardware and software and may include a microprocessor and memory for storing program code and data. The computer may include a means for regenerating some or all of the bit sequence represented by the wireless signal and store some or all of the bit sequence in the computer main memory. Optionally, the information conveyed by the bit sequence may require additional processing or action by the computer. When the information is processed the computer may then return to the power-saving mode.

The wireless signal may be transmitted through a radio frequency (RF) channel. For example, a radio device may be an RF module equipped with an RF antenna and used within a RF system. The device that receives wireless communications may be an integrated radio device or it may be an optional attachment. It may be embedded within the cover of a device bay. By providing alternate device bay covers or other mechanism, the device that receives wireless communications may be an optional attachment for the computer that may be added by the user or a technician.

The methods of the present invention are applicable to remote communications through a fixed wire, such as a telephone line or local area network cable. The receiving means may include an option card located in a option card slot or in a docking station. While a computer is operating in a power-saving state, a power-on request may be initiated by a LAN adapter, or PC card such as a modem to enable remote communication.

The remote communication may transfer information such as an EMAIL message or a command for the computer to exit a power-saving mode and continue execution of any program that was suspended when the computer entered.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a schematic block diagram of an illustrative embodiment of a computer with which the method and system of the present invention may advantageously be utilized;

FIG. 2 shows a schematic block diagram of a power control circuit and a RF module in accordance with he methods of the resent invention;

FIG. 3 is a flow chart of a method of the present invention;

FIG. 4 is a block diagram showing a second embodiment of the present invention; and FIG. 5 is an example of an outline of a computer embodying the present invention.

DETAILED DESCRIPTION OF THE PREFERRED EMBODIMENT

With reference now to the figures and in particular with reference to FIG. 1, there is an embodiment of the present invention for enabling wireless communications to a notebook computer 10. A central microprocessor 11 executes programs under the control of an operating system. The central microprocessor 11 is coupled to a bridge circuit (a host-PCI bridge), which is called a memory/PCI control chip 15, through system bus 13. The memory/PCI control chip 15 includes a memory controller function for controlling memory 17 accesses, a data buffer decoupling the system bus 13 and PCI bus 19, which have different data transfer speeds.

A main memory 17 is readable and writeable for storing program code or data used by programs. Programs include an operating system, various device drivers for controlling peripherals, application programs, and BIOS stored in a FLASH ROM 49. A video subsystem 21 includes a video controller which handles request from the central microprocessor 11 and displaying image information on a liquid crystal screen (not shown) stored in video memory (VRAM).

A bus controller 23 provides an interface between the PCI bus 19 and a PCI option card slot 25. A multifunction PCI device 27 communicatively couples the PCI bus 19 to an I/O bus 39. The multifunction PCI device 27 includes PCI bus 19 to I/O bus 39 bridge, a DMA controller, a programable interrupt controller (PIC), a programable interval timer (PIT), an integrated drive electronics (IDE) interface, a universal serial bus (USB) interface, and a system management bus (SMB) interface. A multifunction PCI device 27 may be implemented using a PIIX4 chip supplied by Intel Inc.

Notebook computer 10 includes an IDE hard disk drive (HDD) 31 and a CD-ROM drive 32 which are both connected to the IDE interface. A digital video disk or digital versatile disk (DVD) may be connected to the IDE interface in place of the CD-ROM drive 32. The hard drive 31 and CD-ROM 32 may be housed in an external housing called a device bay, which is considered a portion of the overall computer system 10. These storage devices are standard and are interchangeable with other devices such as floppy disk drives (FDD) and batter packs.

A RF module 33, is connected to the multifunction PCI deice 27, in this embodiment. The RF module 33 which is electronically coupled to an antenna 37 provides transmission and reception of information transferred using radio frequency (RF) channels and is responsive to received information having a particular identification tag. The RF module receives a signal representing a sequence of bits conveying information transmitted by remote transmitter and provides data received to the computer system which is typically stored in main memory 17. The RF module 33 can instruct the computer to exit a power-saving mode and begin active operation.

In this embodiment the RF module 33 and the RF antenna 37 are embedded in a cover 209 of a device bay which contains a hard drive 21. RF Module 33 and antenna 37 can be options for the particular computer. A user that does not require the radio communication function can select a cover 209 for the device bay that does not have RF module 33 and RF antenna 37. The cover can be optionally attached by the user or by a technician at the sales outlet. RF module 33 receives power through an FET switch 35 which is connected to a voltage source.

The I/O bus 39 may be an IBM AT compatible ISA bus which is connected to a super I/O controller 41, a power source controller 45, a flash ROM 49, and CMOS memory 50. A super I/O controller is a peripheral controller for controlling a floppy disk, parallel port, a serial port, and I/O port 43. Power source controller 45 includes a microprocessor (MPU), RAM, ROM, and a timer. The ROM contains programs and reference tables necessary for performing a the power management and thermal management for the computer. Power supply controller 47 is connected to the power source controller 45. Power supply controller 47 includes a DC/DC converter for generating a constant voltage such as 5 V and 3.3 V for use by the computer. Power supply controller 47 also includes a battery charger for charging a battery. Power supply controller 47 directs power under the control of the power source controller 45.

Power source controller 45 has an writeable register with a VCC5P_On output signal which controls FET switch 35. When VCC5p_On bit is set to logic level 1, power is supplied to the RF module 33 and when this bit is set to logic level 0, power to RF module 33 is disabled. The VCC5p_ON register output is routed to and driven by serial-parallel port converter 77 in the power switch controller 48.

A register in RF controller 46 includes an RF_Enable bit which is set by a setup utility. The RF_Enable bit is set to logic level 1 to indicate that RF module 33 is attached and active, and is set to logic level 0 when the RF module 33 is not attached or not active.

RF controller 46 has a register with an output signal Battery5M_On which is used to maintaining power to the RF module 33 when the system is in a power-saving mode. When Battery5M_ON bit is set to logic level 1, voltage source VCC5M and VCC3M are enabled. The Battery5M_On register output is received by an OR gate 79 which generates a signal received by power-on logic 75. Power-on logic 75 generates control signal V5ON which is received by a regulator circuit 69 which generates source voltages VCC5M and VCC3M.

A setup utility keeps a status bit WakeON_RF indicating whether the power-saving mode may be exited by a request from the RF module 33. This bit is set to logic level 1 when these request are enabled and to logic level 0 when they are not.

A FLASH ROM 49 is a rewritable non-volatile memory for permanent storage for BIOS program code, which provides interface to many standard I/O functions such as keyboard and floppy drive as well as a power on systems test (POST).

Other circuits necessary for implementing the notebook computer, which are not disclosed herein, are well known by those skilled in the art.

Referring now to FIG. 2 which is a schematic block diagram showing an embodiment of a power-on function that utilizes the methods of the present invention. A power supply controller 47 includes a regulator 67, a switch 71, and a AC/DC detection logic 73. Regulator 67 receives an AC power source 61, a main battery 63 power source, and a sub-battery 65 power source, and when any of these power sources are connected supplies output voltage source VccSW. Regulator 69 is responsive to an input signal V5ON. When V5ON is logic level 1 the regulator enables output power sources Vcc5B, Vcc3A, and VCC3B. AC/DC detection logic 73 monitors the AC Power source 61, and generates a signal AC-DC_5M_ON indicating when AC power Source 61 is connected.

The voltage sources VCCSW, VCC5M, Vcc3M, VCC3a, Vcc5B, and Vcc3B are voltages sources used by the computer to power particular circuits. VccSW is enabled when one of the power sources 61, 63, 65 are connected. Vcc5M and Vcc3M are normally supplied when the AC adapter used for battery charge is F connected. When the computer is in a power-saving mode normally VccSW is the only voltage source that is enabled.

Power switch control 48 receives VccSW which is always active when any power source 61, 63, 65 is connected and active. This circuit includes power-on logic 75, serial-parallel converter 77, OR device 79, an AND device 81, detection circuits 83, 85 and an inverter 87. Power-On logic 75 receives the output from OR device 79 and the output from AND device 81. Regulator circuit 69 and switch circuit 71 each receive an output signal generated by power-on logic 75. OR device 79 receives signal AC-DC_5M_ON from AC/DC detection logic 73. The other input to the OR device 79 is generated by RF controller 46, which is a part of RF module 33.

AND device 81 receives a signal from detection circuit 85, which is also received by power source controller 45 for requesting that a power-saving mode be exited. This signal is also independently driven by a docking station 91, MiniPCI bus system 93, and a card bus system 95. This signal may be driven by a card installed in a card bus slot 25 or a device attached to a USB connector 29.

AND device 81 also receives a signal from RF module 33. This signal is driven by detection circuit 83 and indicates when signal Wake_Up is active. Signal Wake_Up is also received by source controller 45. Serial-parallel converter 77 receives a signal coupled through the power source controller 45 to a signal from the RF module 33. The serial-parallel convertor 77 drives a signal that is received by a control input to the FET switch 35 and a signal that is received by RF module 33.

RF module 33 transmits and receives information using radio frequency channels. For example RF module 33 may receive an instruction to turn the computer's power on that is in power-saving mode. It may enable a program that is suspended because of the computer entering power-saving mode to continue execution. The identification tag which is be embedded in data received by the RF module 33 indicating that the signal is targeted for the computer, can also be used for security purposes.

The RF module 33 is coupled to an RF antenna 37. RF module 33 is comprised of regulator 51, a module body 55 and a toggle switch 57. Regulator 51 generates voltage source BT3V and receives power through FET switch 35, which controls power source Vcc5M to RF module 33.

The state of toggle switch 57 determines whether power is received by RF Module 33. One terminal of toggle switch 57 is connected to ground, the other terminal of toggle switch 57 is connected to VCC5M through a resister. When toggle switch 57 is set to ON (conductive) then power source controller 45 responds by disabling power to RF module 33.

RF module 33 facilitates handling of USB interface signals (Vcc5P, +D/−D, and GND) as well as various control signals such as Wake_Up, Detach, Flash UPD, and BTN. RF module 33 receives a signal Detach from serial-parallel convertor 77, indicating whether a USB signal may be received. RF module 32 is connected to signal +D/−D of the USB interface. RF Module 33 drives Wake_Up signal which is received by power source controller 45 and OR device 79, for facilitating the function of having the computer exit power-saving mode and start active operation.

Data received from RF antenna 37 may be transferred to the computer to either start execution of a specified computer program or the data may be used by a computer program. While the computer is in a power-saving mode, it may be difficult for the computer to receive the data incoming from RF antenna 37.

In one embodiment of the present invention the reception of an incoming RF signal is always monitored allowing for the computer to exit a power-saving mode and start active operation when an RF signal which is directed to the computer is detected.

Referring now to FIG. 3 which is a flow chart illustrating a methods of the present invention for having a computer which in a power-saving mode start active operation when a RF signal is sent to the computer. This method allows the circuit and software for managing power-saving mode to interact with the power control circuitry to maintain power to RF module 33 during power-saving mode, and to receive a command (Wake_Up) from RF Module 33 to exit power-saving mode to read data received by RF module 33. This method is effective in any power-saving mode where power consumption is suppressed, such as standby, suspend, and sleep modes. This method allows electronic documents to be transferred to a computer, such as EMAIL, and database updates without requiring actions by the user.

In step 101, the computer is powered on. BIOS is read from FLASH ROM 49 and copied into main memory. Central microprocessor 11 reads an RF data reception program for executing the following procedure.

In step 103, a request is made to shift the computer into a power-saving mode where at least some of the computer systems are powered down. This request may come directly from a user request or indirectly from the operating system as specified by the user. When a request is detected step 105 is executed where the RF_Enable bit is checked to indicate whether RF module 33 is installed and active. If this bit is not asserted (logic level 0) then normal power-saving mode is entered in step 111, otherwise step 107 is executed, in which status bit WakeOnRF is checked to determine whether power-on with RF communication is enabled. If this function is not enabled, then normal power-saving mode is entered in step 111. Otherwise, in the next step 109, Battery5M_ON bit and VCC5P ON bit are set to logic level 1 so that power is maintained to the RF module when power-saving mode is entered. When Battery5m_On and Vcc5p_On are set a logic level 1, power-on logic 75 drives control signal V5ON to the regulator circuit, for keeping the source voltages VCC5M and VCC3M active. Also when signal Vcc5p On is asserted, FET switch 35 is made conductive to maintain an active power source VCC5M to drive the RF module 33.

In step 113, the system request that power-saving mode be entered and step 115 is entered. Thus, in power-saving mode, voltage source Vcc3A is maintained as well as Vcc5M, and VccSW although other voltage sources and circuits they feed may be disabled. Source voltage VccSW is maintained to power switch controller 48 during power-saving mode allowing this switch to drive the drive the power On logic for causing switch circuit 71 to enable the computer voltage sources. In step 115, the Wake_Up signal from RF module 33 is monitored. When Wake_Up signal is asserted, step 117 is executed where functions are requested which are necessary for returning to active operation.

Step 119 is executed for handling any other processing necessary for exiting power-saving mode. In step 121, the reason for exiting power-saving mode is determined. If it is determined that the reason for exiting power-saving mode is a request from RF module 33, then data received by RF module 33 is read in to the computer's main memory. Step 125 is entered where the system reenters power-saving mode in a manner indicated by previously stored information in memory or on the hard drive.

Now referring to FIG. 4 the method of the present invention may be applied to remote communication through a device installed in a docking station 91, MiniPCI bus system 93, or a card bus system 95 for enabling the computer to exit power-saving mode to communicate with peripherals such as a radio receiver/transmitter, a modem, or LAN adapter.

Docking station 91 is comprised of a radio device 91 which is electronically coupled to both an antenna 91C and a docking controller 91A. Docking controller 91A is electronically coupled to both a detection circuit 85 and a power source controller 45.

Embodiments of the present invention enable a docking station 91, MiniPCI bus 93, or card bus system 95 to communicate to the system, which is in power-saving mode when data is received either through wireless communication methods or a fixed wire communication methods such as a telephone line or cable connection to a local area network(LAN). MiniPCI bus system 93 is comprised of a radio device 93B which is electronically coupled to both an antenna 93C, and a modem 93A. Card bus system 95 is comprised of a radio device 95B which is electronically coupled to both an antenna 95C and a card bus controller 23. Modem 93A and card bus controller 23 are electronically coupled to both detection circuit 85 and power source controller 45.

Docking controller 91A is powered from voltage source VccDOCK. Modem 93A is powered from voltage source VccMPC1 and card bus controller 23 is powered from voltage source VccCBC.

These source voltages VccDOCK, VccMPC1, and VccCBC are provided while in power-saving mode in a manner similar to the above described methods for proving Vcc5p to the RF module 33 while in power-saving mode. Signals (PME) provide the equivalent function of the WakeUp signal in the above described methods. When the PME signal is active, power on logic 75 generates a signal to switch circuit 71 to turn power on to the system and exit power-saving mode.

Now referring to FIG. 5 which shows an outline of a computer 10 embodying the present invention. The computer 10 comprises a body 201 containing the components shown in FIG. 1, a crystal display 203, a keyboard 207, a CD-ROM drive 32, and a cover of a device bay containing a hard drive 31. Cover 209 of the device bay may be used to contain RF module 33 and antenna 37.

While the invention has been particularly shown and described with reference to preferred embodiments, it will be understood by those skilled in the art that various changes in form and detail may be made therein without departing from the spirit and scope of the invention.

The invention claimed is:

1. A method for receiving a wireless signal by a computer adapted to operate in a power-saving mode, said method comprising:

providing a plurality of status bits to indicate whether or not a RF module is attached to said computer and is activated;

detecting within said computer a wireless signal representing a bit sequence when said computer is operating in a power-saving mode, wherein said wireless signal is targeted for said computer;

determining whether said RF module is attached to said computer and is activated by reading said plurality of status bits;

exiting said power-saving mode only if said RF module is attached to said computer and is activated;

regenerating some or all of said bit sequence of said wireless signal; and storing said some or all of said bit sequence of said wireless signal in a memory after exiting said power-saving mode.

2. The method of claim 1, wherein said detecting further includes detecting a particular identification tag embedded in said bit sequence.

3. The method of claim 1, wherein wireless signal is transmitted through a radio frequency channel.

4. The method of claim 1, wherein said bit sequence includes a request for said computer to exit said power-saving mode.

5. The method of claim 1, wherein said bit sequence includes a request to resume execution of a program that has been suspended when said computer is in said power-saving mode.

6. The method of claim 1, wherein said method further includes setting a field effect transistor (FET) switch to maintain power to a receiving means prior to entering said power-saving mode.

7. The method of claim 1, wherein said method further includes:

processing information conveyed by said bit sequence; and automatically returning to said power-saving mode after said processing.

8. A computer for receiving a wireless signal while in a power-saving mode, said computer comprising:

a receiving means adapted to detect a wireless signal representing a sequence of bits, wherein said receiving means is adapted to regenerate some or all of said bit sequence, wherein said wireless signal is targeted for said computer;

a plurality of status bits for indicating whether or not a RF module is attached to said computer and is activated;

a power-saving mode control means adapted to exit said power-saving mode only if said plurality of status bits indicate said RF module is attached to said computer and is activated;

a field effect transistor (FET) switch for enabling power to said receiving means when said computer is in said power-saving mode; and a memory for storing said some or all of said regenerated bit sequence after said computer has exited said power-saving mode.

9. The computer of claim 8, wherein said receiving means is an optional attachment to said computer.

10. The computer of claim 8, wherein said receiving means is formed in a device bay cover.

11. The computer of claim 10, wherein said device bay cover is an optional attachment to said computer.

* * * * *